(12) United States Patent
Benz et al.

(10) Patent No.: US 7,540,558 B2
(45) Date of Patent: Jun. 2, 2009

(54) DOOR PILLAR FOR A SUPPORTING STRUCTURE

(75) Inventors: Eberhard Benz, Gaertringen (DE); Konrad Eipper, Rottenburg (DE); Stephan Goettker, Stuttgart (DE)

(73) Assignee: Daimler AG, Stuttgart (DE)

( * ) Notice: Subject to any disclaimer, the term of this patent is extended or adjusted under 35 U.S.C. 154(b) by 85 days.

(21) Appl. No.: 10/582,273

(22) PCT Filed: Nov. 27, 2004

(86) PCT No.: PCT/EP2004/013480

§ 371 (c)(1),
(2), (4) Date: Feb. 15, 2007

(87) PCT Pub. No.: WO2005/056369

PCT Pub. Date: Jun. 23, 2005

(65) Prior Publication Data

US 2007/0236050 A1    Oct. 11, 2007

(30) Foreign Application Priority Data

Dec. 11, 2003  (DE) ................................ 103 57 907

(51) Int. Cl.
*B62D 25/04* (2006.01)
(52) U.S. Cl. .............................. 296/193.06; 296/203.03
(58) Field of Classification Search ............ 296/193.06, 296/193.05, 203.01, 203.03, 30, 187.01, 296/187.03, 187.12, 181.4
See application file for complete search history.

(56) References Cited

U.S. PATENT DOCUMENTS 5,398,989 A * 3/1995 Winter et al. .......... 296/203.03
5,941,597 A * 8/1999 Horiuchi et al. ........ 296/203.01
6,378,933 B1 * 4/2002 Schoen et al. .......... 296/187.02
2001/0020797 A1  9/2001 Saeki
2002/0104591 A1  8/2002 Gehringhoff et al.

FOREIGN PATENT DOCUMENTS

| DE | 41 39 303 A1 | 6/1992 |
|---|---|---|
| DE | 10018898 A1 | 11/2000 |
| EP | 0836983 A2 | 4/1998 |
| EP | 1132280 A1 | 9/2001 |
| EP | 1138581 A2 | 10/2001 |
| EP | 1180470 A1 | 2/2002 |
| WO | WO 03/031252 A1 | 4/2003 |

OTHER PUBLICATIONS

Klein, B., "Leichtbau in Automobilbau [Lightweight Construction in Automotive Engineering]", Electronic publication of the field of lightweight construction, Universiteat Kassel, Dec. 2002 version, Sec 7.2 and 14.3 to 14.6.
DFG-Forschergruppe, "Hochleistungsfuegetechnik fuer Hybridstrukturen [High Performance Joining Technology for Hybrid Structures]", research program, version Apr. 1, 2003, under the heading "Ausgangssituation [Starting-situation]".
German Office Action dated Oct. 19, 2006 with an English translation of the pertinent portions (Eight (8) pages).
International Search Report.

* cited by examiner

*Primary Examiner*—Dennis H Pedder
*Assistant Examiner*—Melissa A Black
(74) *Attorney, Agent, or Firm*—Crowell & Moring LLP

(57) ABSTRACT

A door pillar for a supporting frame structure of a vehicle body has an upper section which extends from a vehicle roof as far as a vehicle side edge, and a lower section which extends from the vehicle side edge in the direction of a vehicle floor. In order to improve the door pillar with regard to loading and weight, it has a pillar body which extends at least in the upper section and is made of iron or iron alloy, and a pillar base which is connected fixedly thereto, extends at least in the lower section, and is made of light metal or light metal alloy.

17 Claims, 1 Drawing Sheet

DOOR PILLAR FOR A SUPPORTING STRUCTURE

BACKGROUND AND SUMMARY OF THE INVENTION

The present invention relates to a door pillar for a supporting frame structure of a vehicle body.

European document EP 1 138 581 A2 discloses a door pillar of this type which has an upper section and a lower section. The upper section extends from a vehicle roof as far as a vehicle side edge while the lower section extends from this vehicle side edge in the direction of a vehicle flow. The known door pillar is configured as a single piece in the form of a thin-walled cast steel part. With a body component which is produced from thin-walled cast steel and is not assembled—as previously customary—from a plurality of sheet-metal parts, a considerable saving on weight, for example in the order of magnitude of approximately 25%, can be achieved. Furthermore, wall thickness and shaping can be matched virtually as desired to the particular strength requirements. In particular, wall thicknesses which occur in the case of comparable, conventional body components made of sheet metal can therefore be achieved. Similarly, very complex components can be produced in a single piece, thus omitting the outlay on assembling a plurality of individual sheet-metal components.

The known door pillar is configured as an A-pillar or B-pillar of the supporting frame structure.

It is known from international publication WO 03/031252 A1 to design a door pillar, in particular an A-pillar of a convertible, as a thin-walled cast steel part in such a manner that it has an essentially lattice-like casing which is at least partially filled by a core of metal foam or of metallic hollow spheres and is therefore reinforced.

In the finished motor vehicle, the door pillars of the supporting frame structure have an important safety function, since they help to protect the passenger cell in the event of a crash, in particular if the vehicle rolls over, from a deformation which could put the occupants at risk. Accordingly, the door pillars have to have particularly great strength especially in their upper sections. To date, such strength values cannot be achieved with light metal alloys; consequently, the door pillars have hitherto always been produced from iron or iron alloys, preferably from steel. However, iron materials are comparatively heavy, and so the door pillars have a comparatively high weight. To protect resources, it is, however, desirable for modern motor vehicles to be constructed as lightly as possible, which firstly leads to reduced fuel consumption and secondly to a reduced emission of pollutants.

The present invention is concerned with providing an improved embodiment of a door pillar of the type mentioned which makes it possible to obtain a reduced weight for a vehicle equipped therewith.

The general concept of the invention is to divide the door pillar into at least two components which, although connected fixedly to one another, are produced from different materials. This firstly involves a pillar body which extends at least in the upper section of the door pillar and which is produced from iron or from an iron alloy. This secondly involves a pillar base which extends at least in the lower section of the door pillar and is produced from a light metal alloy. The hybrid construction proposed according to the invention makes it possible to assign different functions to the two components of the door pillar. As a result, the two components can be optimized with regard to the respectively assigned function in terms of selection of material and, in particular, in terms of shaping and method of production. The pillar body produced from iron or iron alloy can be provided straight away with the stability required for the door pillar. In this connection, it has been recognized that the high strength of the door pillar is required only in the upper section, since, in the lower section, other parts of the supporting frame structure additionally contribute to protecting the passenger cell from deformation. From this results the finding that the pillar base manages with lower stability, and so can be produced from a light metal alloy in order to save weight in the lower section of the door pillar. Via the pillar base, the connection of the pillar body to the rest of the supporting frame structure takes place at the same time.

According to an advantageous embodiment, the pillar body extends into the lower section, preferably as far as the vehicle floor. A particularly intensive coupling between pillar base and pillar body can thereby be formed in the lower section. This improves the transmission of the forces occurring during operation or in the event of a crash, thus making it possible to achieve or improve the desired stiffness for the passenger cell.

Of particular interest is an embodiment in which the pillar base is designed as a cast part and is cast onto the pillar body. In such an embodiment, the pillar body can be integrated in the lower section into the pillar base in a particularly simple manner. Simply by the casting-on operation, an adequately fixed connection between pillar body and pillar base can be achieved. By casting the pillar base onto the pillar body additional installation steps for connecting the pillar body to the pillar base can be omitted.

In principle, the pillar body can be produced as desired, for example the pillar body can be configured as a single-part cast part, in particular as a thin-walled cast part. Similarly, it is possible to configure the pillar body as a single-part or multi-part sheet-metal component.

Further important features and advantages of the invention emerge from the subclaims, from the drawings and from the associated description of the figures with reference to the drawings.

It goes without saying that the features mentioned above and those which have yet to be explained below can be used not only in the respectively stated combination but also in other combinations or on their own without departing from the scope of the present invention.

A preferred exemplary embodiment of the invention is illustrated in the drawing and is explained in more detail in the description below.

DETAILED DESCRIPTION OF THE INVENTION

Figure 1:
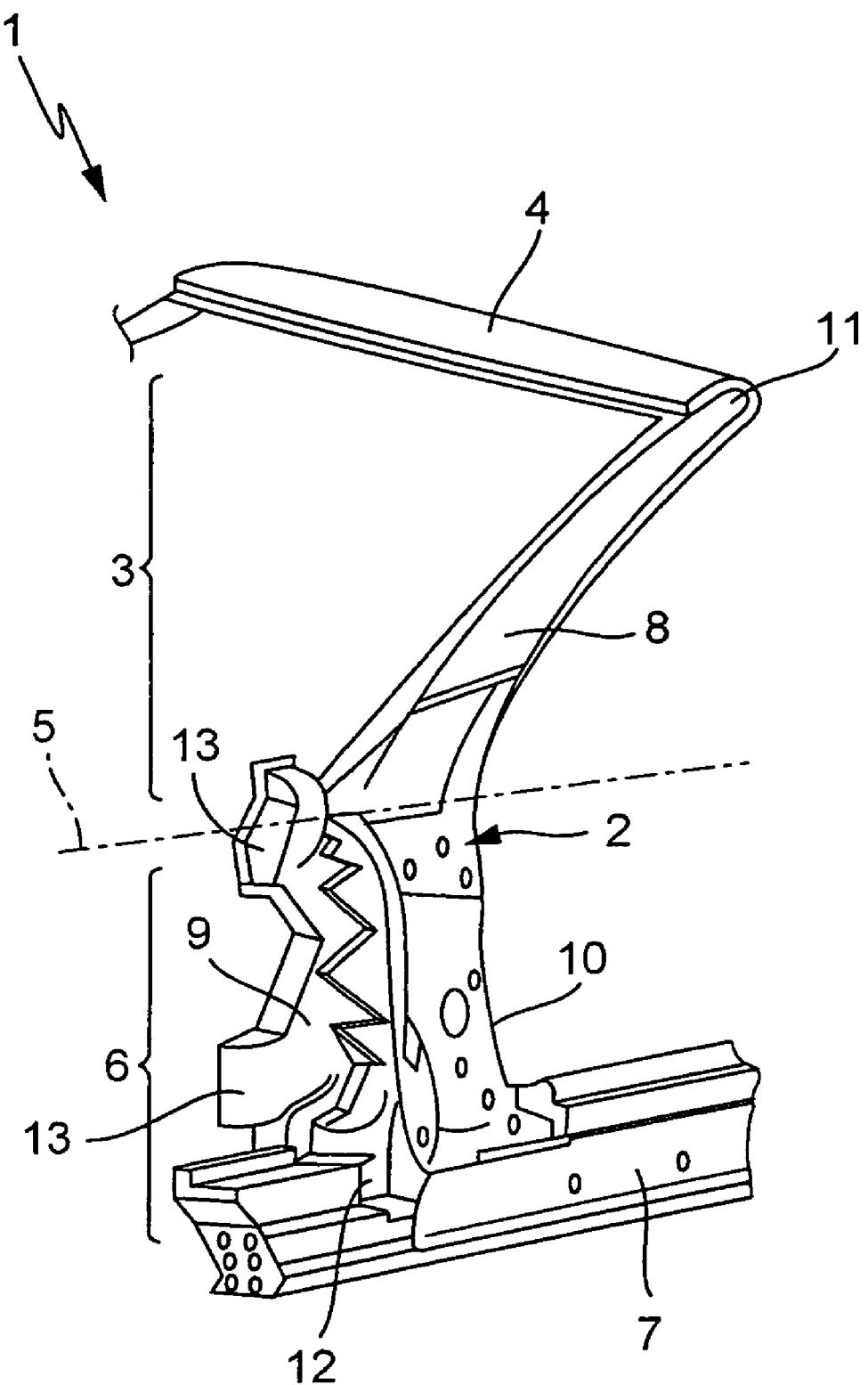
FIG. 1, the sole figure, shows a simplified perspective view of a region of a supporting frame structure that is provided with a door pillar according to the invention.

According to FIG. 1, a supporting frame structure 1 (only partially illustrated) of a vehicle body (otherwise not illustrated) comprises at least one door pillar 2 which is configured according to the invention. In the present case, the door pillar 2 is an A-pillar of the vehicle that is arranged on the left with respect to the direction of travel, with it here also being the A-pillar 2 of a convertible. In principle, the right A-pillar (not shown) can also be constructed in a corresponding manner according to the invention. It is clear that, in the case of another motor vehicle, in particular in the case of passenger vehicles, the B-pillar and/or the C-pillar and/or the D-pillar may also be configured in accordance with the invention. However, the supporting pillar 2 according to the invention is explained in more detail below with reference to the variant in which it is configured as an A-pillar 2 of a convertible, with this taking place without restricting the generality.

According to FIG. 1, the supporting pillar 2 extends in an upper section 3, indicated by a bracket, from a vehicle roof, only represented here by an upper cross member 4, as far as a vehicle side edge 5 (indicated by a chain-dotted line), and, in a lower section 6, likewise indicated by a curly bracket, from the vehicle side edge 5 as far as a vehicle floor, which is represented by a vehicle cell 7. According to the invention, the door pillar 2 is now constructed from a pillar body 8 and a pillar base 9. In this case, the pillar body 8 extends at least in the upper section 3 while the pillar base 9 extends at least in the lower section 6. It is of particular importance here that the pillar body 8 is produced from iron or from an iron alloy, in particular from steel, while the pillar base 9 is produced from light metal, in particular aluminum, or from a light metal alloy, in particular from an aluminum alloy. The two components of the door pillar 2, i.e. the pillar body 8 and the pillar base 9, are connected fixedly to each other and, as a result, form a unified subassembly. The connection of the door pillar 2 to the rest of the supporting frame structure 1, in particular to the vehicle floor, takes place via the pillar base 9.

In the case of the preferred embodiment shown here, the pillar base 9 extends exclusively in the lower section 6 while the pillar body 8 protrudes at least partially into the lower section 6. In the present case, the pillar body 8 extends from the vehicle roof as far as the vehicle floor. In this manner, the connection between pillar body 8 and pillar base 9 takes place exclusively in the lower section 6. In the present case, the pillar body 8 in the lower section 6 forms a type of covering for a partial region of the pillar base 9 by a lower region 10 of the pillar body 8, which region is arranged in the lower section 6, at least partially covering an outside of the pillar base 9. In the present case, this lower region 10 on the pillar base 9 extends from the side of the vehicle situated on the outside as far as a rear side, as a result of which the outer side of the pillar base 9 is covered at least on two sides in a shell-shaped manner.

At its upper end, the pillar body 8 has a roof connection zone 11. In the region of this roof connection zone 11, the pillar body 8 is connected fixedly to the vehicle roof or to the roof member 4 shown. In particular in the case of a convertible, the two A-pillars 2 are connected to each other via the upper roof cross member 4 and via a floor cross member (not shown here) arranged in the vehicle floor to form an annularly closed frame which is also referred to as the front wall frame. In order to be able to connect the pillar body 8 to the roof cross member 4 in as simple a manner as possible, the roof connection zone 11 is configured in a corresponding manner or is prepared for the connection to the roof member 4.

On its lower side, the pillar base 9 is provided with a floor connection zone 12 which makes it possible to connect the pillar base 9 fixedly to the vehicle floor or here to the cell 7. The floor connection zone 12 is expediently designed in such a manner that the connection to the vehicle floor can be produced in a particularly simple manner. In the present case, the contour of the floor connection zone 12 is shaped in a complementary manner to the contour of the cell 7, thus achieving a form-fitting support of the pillar base 9 on the cell 7, which at the same time facilitates the production of an adequately fixed connection between pillar base 9 and vehicle floor.

The pillar base 9 is expediently also provided with at least one structure connection zone 13 with the aid of which the pillar base 9 can be attached fixedly to at least one further component (not shown here) of the supporting frame structure 1. For example, front longitudinal members of the supporting frame structure 1 can be attached to the door pillar 2 via the at least one structure connection zone 13. Here too, the structure connection zones 13 are expediently prepared for the production of the particular connection, in particular by means of a corresponding shaping.

In principle, the pillar body 8 can be produced in any desired manner. For high stiffness requirements, single-part or multi-part sheet-metal components have proven successful for the construction of the supporting frame structure 1, and so, according to a first variant, the pillar body 8 is configured as a sheet-metal component and is therefore constructed from one or from more sheet-metal parts. According to a second variant, the pillar body 8 may alternatively also be configured as a single-part cast part, preferably as a thin-walled cast part. In particular in the case of thin-walled cast parts which can have wall thicknesses between 1.0 and 4.0 mm, in particular between 1.5 and 3.0 mm, adequately stiff structures can be obtained which are also of comparatively lightweight construction. For example, in the upper section 3 the pillar body 8 can have a lattice-like structure which can also be optimized bionically. Modern calculation techniques, such as, for example, the FEM technique, i.e. the Finite Element Method, make it possible here to optimize the cast component in terms of high stability and low weight.

For the pillar base 9, an embodiment is preferred in which the pillar base 9 is configured as a single-part cast part. The design of the pillar base 9 as a thin-walled cast part may also be advantageous here.

The production of the door pillar 2 according to the invention can be simplified, for example, by the pillar body 8 initially being produced in a conventional manner as a sheet-metal component or as a cast component while the pillar base 9 is subsequently cast onto the previously produced pillar body 8. In this manner, at the same time as the production of the pillar base 9 an intensive connection between pillar body 8 and pillar base 9 can be produced. As a result, subsequent installation steps for assembling the door pillar 2 can be omitted.

An intensive anchoring of the pillar body 8 on or in the pillar base 9 can be achieved, for example, by a form-fitting connection and/or a connection with a cohesive material joint being produced between pillar base 9 and pillar body 8.

To obtain a form-fitting connection, in the region around which the pillar base 9 is cast, the pillar body 8 can have, for example, at least one aperture through which the pillar base 9 is passed during the casting operation. Additionally or alternatively, the pillar body 8 can have at least one undercut contour, for example in the form of a transversely protruding tab or an angled edge which is enclosed by the pillar base 9 being cast on. A form-fitting connection of this type can generally only be released again by destruction of the pillar body 8 and/or the pillar base 9.

A connection between pillar body 8 and pillar base 9 with a cohesive material joint can be produced, for example, by, during the casting on of the pillar base 9, the surface of the pillar body 8 at least partially melting, as a result of which a fusion of the different metals or metal alloys can occur.

As an alternative to the casting of the pillar base 9 onto the pillar body 8, the pillar body 8 can also be screwed, riveted, welded and/or soldered to the pillar base 9.

It is essential in the invention that two important functions of the door pillar 2, namely, firstly, the stiffening of the passenger cell in the upper section 3 and, secondly, the connection of the door pillar 2 into the rest of the supporting frame structure 1, are separated from each other and are assigned to separate components of the door pillar 2, namely the pillar body 8 and the pillar base 9. By means of the production of the pillar body 8 from iron or from iron alloy and the production of the pillar base 9 from light metal or from light metal alloy, pillar body 8 and pillar base 9 are adapted to the function assigned to them in each case. The pillar body 8 which is produced from iron or iron alloy can provide the desired strength in the upper section 3 while the pillar base 9 which is produced from light metal or light metal alloy readily permits the installation of the door pillar 2 into the rest of the supporting frame structure 1 and at the same time brings about an advantage in terms of weight.

The invention claimed is:

1. A door pillar for a supporting frame structure of a vehicle body, comprising:
   an upper vehicle body section which extends from a vehicle roof as far as a vehicle side edge,
   a lower vehicle body section which extends from the vehicle side edge in the direction of a vehicle floor,
   a pillar body, which extends at least in the upper section and is made of a first, iron or iron alloy material, and
   a pillar base, which is fixedly cast onto the pillar body, which extends exclusively in the lower section, and which is configured as a single-part thin-walled cast part made of a second, light metal or light metal alloy material.

2. The door pillar as claimed in claim 1, wherein the pillar body at least partially extends into the lower section, and wherein the pillar body is connected in the lower section to the pillar base.

3. The door pillar as claimed in claim 1, wherein the pillar body extends from the vehicle roof as far as the vehicle side edge, into the lower section, or as far as the vehicle floor.

4. The door pillar as claimed in claim 1, wherein the pillar body has a roof connection zone which is configured for forming a fixed connection to at least one of the vehicle roof and a roof member.

5. The door pillar as claimed in claim 1, wherein the pillar base has a floor connection zone which is configured for forming a fixed connection to the vehicle floor.

6. The door pillar as claimed in claim 1, wherein the pillar base has at least one structure connection zone which is configured for forming a fixed connection to a part of the supporting frame structure.

7. The door pillar as claimed in claim 1, wherein the pillar body is configured as a single-part or multi-part sheet-metal component or as a single-part, thin-walled cast part.

8. The door pillar as claimed in claim 1, wherein the pillar body in the lower section at least partially covers the pillar base on the outside thereof.

9. The door pillar as claimed in claim 1, wherein the door pillar is any of an A-pillar, a B-pillar, a C-pillar, and a D-pillar.

10. The door pillars claimed in claim 1, wherein the door pillar is an A-pillar in a convertible.

11. The door pillar as claimed in claim 2, wherein the pillar body extends from the vehicle roof as far as the vehicle side edge, into the lower section, or as far as the vehicle floor.

12. The door pillar as claimed in claim 2, wherein the pillar body has a roof connection zone which is configured for forming a fixed connection to at least one of the vehicle roof and a roof member.

13. The door pillar as claimed in claim 3, wherein the pillar body has a roof connection zone which is configured for forming a fixed connection to at least one of the vehicle roof and a roof member.

14. The door pillar as claimed in claim 2, wherein the pillar base has a floor connection zone which is configured for forming a fixed connection to the vehicle floor.

15. The door pillar as claimed in claim 3, wherein the pillar base has a floor connection zone which is configured for forming a fixed connection to the vehicle floor.

16. The door pillar as claimed in claim 4, wherein the pillar base has a floor connection zone which is configured for forming a fixed connection to the vehicle floor.

17. The door pillar as claimed in claim 2, wherein the pillar base has at least one structure connection zone which is configured for forming a fixed connection to a part of the supporting frame structure.

* * * * *